(12) United States Patent
Charron

(10) Patent No.: US 6,732,274 B1
(45) Date of Patent: May 4, 2004

(54) ELECTRONIC APPARATUS COMPRISING A MEMORY PROTECTION DEVICE AND METHOD OF PROTECTING DATA IN A MEMORY

(75) Inventor: Didier Charron, Monce en Belin (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/207,532

(22) Filed: Dec. 8, 1998

(30) Foreign Application Priority Data

Dec. 15, 1997 (FR) .............................. 97 15879

(51) Int. Cl.[7] .............................. H04L 9/00; G06F 11/30
(52) U.S. Cl. .................. 713/193; 713/176; 713/177; 713/194
(58) Field of Search ................. 713/193, 176, 713/194

(56) References Cited

U.S. PATENT DOCUMENTS

| | | | |
|---|---|---|---|
| 4,623,976 A | 11/1986 | Carp et al. | |
| 4,727,544 A | 2/1988 | Brunner et al. | 371/21 |
| 4,757,468 A | * 7/1988 | Domenik et al. | 713/193 |
| 5,677,952 A | * 10/1997 | Blakley et al. | 713/189 |
| 5,835,588 A | * 11/1998 | Zell | 713/193 |
| 6,014,443 A | * 1/2000 | Mochizuki et al. | 713/193 |

* cited by examiner

*Primary Examiner*—Gilberto Barrón
*Assistant Examiner*—Kambiz Zand
(74) *Attorney, Agent, or Firm*—Dicran Halajian

(57) ABSTRACT

An electronic apparatus has a protection device which includes a random number generator for producing a random number unique to the electronic apparatus. The random number is stored as a personality data in a memory when the electronic apparatus is switched on for the first time. Subsequently, a comparator compares the random number with the personality data stored in the memory and prevents operation of the electronic apparatus device and/or memory access when the comparison result indicates that the random number and personality data are different. The random number generator is formed by a voltage divider of resistors having large tolerances and/or being chosen randomly, where the voltage divider output is converted to a digital value.

20 Claims, 2 Drawing Sheets

ELECTRONIC APPARATUS COMPRISING A MEMORY PROTECTION DEVICE AND METHOD OF PROTECTING DATA IN A MEMORY

FIELD OF THE INVENTION

The present invention relates to an electronic apparatus comprising a protection device for data stored in a memory, the device including means for producing a personality data.

The invention likewise relates to a data protection method.

BACKGROUND OF THE INVENTION

The invention finds interesting applications in the field of portable radio telephones complying with the AMPS standards and others. These apparatus have memories which are capable of containing crucial data, for example: data relating to the serial number which permits of determining the caller and of charging him, or data relating to an prepayment account for radio telephone calls. These data and thus the memory are to be protected to avoid unexpected copies from the side of ill-intentioned persons, or also to certainly avoid the theft of said memory.

From U.S. Pat. No. 4,727,544 is known a system including such a device. This system is intended for electronic gaming devices. According to this patent, read-only memories which contain crucial data are encoded. This encoding makes it possible to detect any violation or copy being made of said memory. This encoding, which determines the personality data, consists of determining a checksum based on the contents of the memory to be protected. This checksum is stored in the protection device and the checksum is computed again when the circuit in which the memory is arranged is switched on. The new checksum is compared with the stored checksum. If a difference is detected, it is estimated that there has been a modification of the memory and the circuit is then blocked.

The device of the patent cited above may in certain applications be considered to be put into operation, which implies processes which quite often invoke the processor of said device too much, which also has tasks to be carried out in the system containing such a device.

SUMMARY OF THE INVENTION

The present invention proposes an apparatus of the above-mentioned type which is particularly simple to use, while offering sufficient guarantee against fraudulent copies.

Therefore, such a device comprises:

a random number generator which produces a number linked with the apparatus containing the device, for forming said personality data, means for storing said random number in said memory when said device is switched on for a first time and a comparing device for comparing the number produced by said generator with the number stored on said first switch-on, so as to block the apparatus in the event of divergence.

The inventive idea is based on the fact that the copied or hidden memory can no longer function in another apparatus, because the generator produces a number that is practically characteristic of the apparatus containing said device.

A variant of embodiment is to be noted according to which said generator is formed by:

a voltage divider formed by resistors which have tolerance values of a certain magnitude, an analog/digital converter for converting the voltage of the voltage divider into a digital magnitude, first processing means for producing said personality data when the means are switched on for a first time based on said digital magnitude, second processing means for comparing said personality data with that produced by said generator, after said first switch-on.

This variant of embodiment offers the considerable advantage that such a generator is of minimum cost and very well performs the function of random number generator. It is thus nearly certain that the generator produces a different value for each apparatus, which thus very well characterizes the apparatus into which it is inserted. Furthermore, the analog/digital converter which converts this value is often available anyhow in check circuits which form part of many electronic apparatus and thus does not create additional cost.

It should also be noted that the use of a potentiometer divider for generating a personality data of an apparatus is described in U.S. Pat. No. 4,623,976. However, this magnitude is not used for protection purposes of capital data. Furthermore, for generating this personality data, the differences of value provided by commercial resistors are not taken into account.

BRIEF DESCRIPTION OF THE DRAWINGS

These and other aspects of the invention will be apparent from and elucidated with reference to the embodiments described hereinafter.

In the drawings.

DETAILED DESCRIPTION OF THE INVENTION

Figure 1:
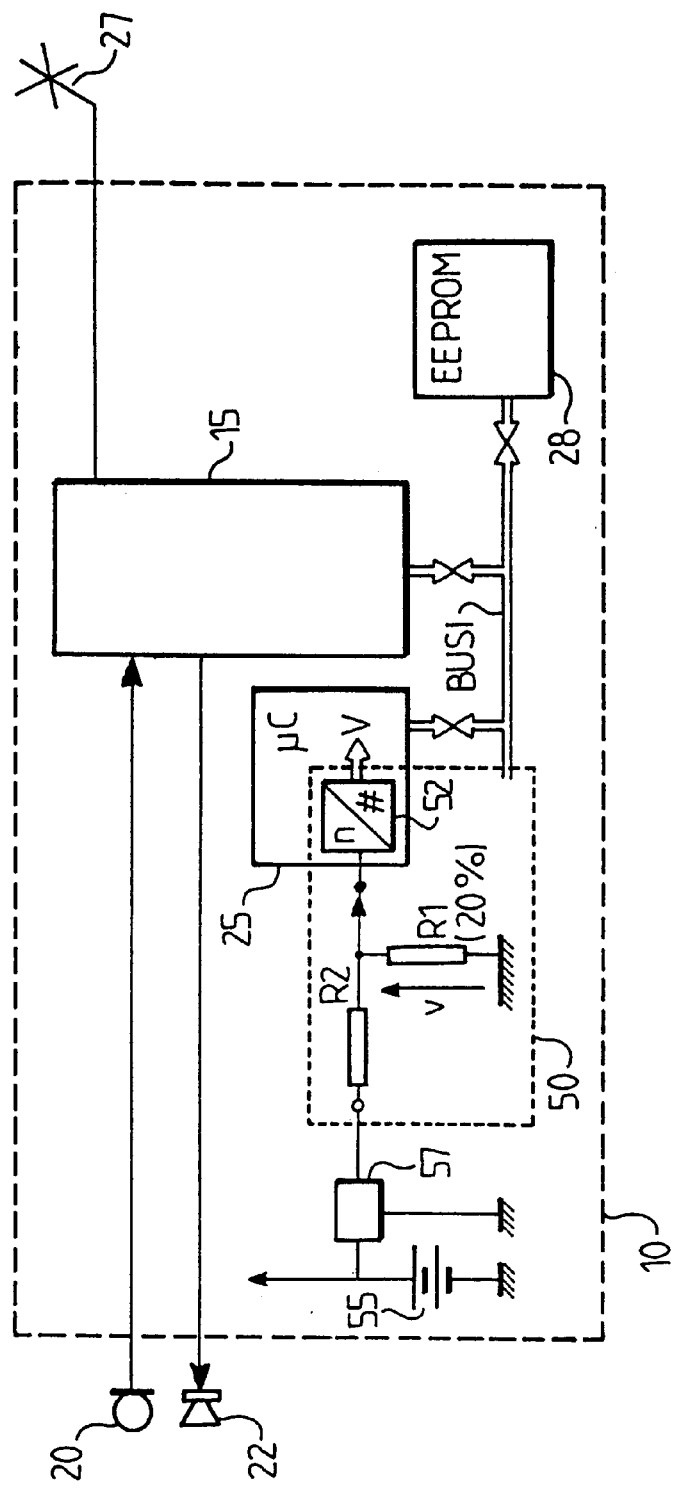
FIG. 1 shows a device in accordance with the invention.

FIG. 1 shows in a diagram an electronic apparatus 10 and, to be more precise, a mobile radio telephone station used in cellular networks such as those defined in accordance with the AMPS standards or similar standards. This apparatus comprises an electronic circuit 15 which is not explained in detail because it does not form part of the invention. This circuit receives speech signals coming from a microphone 20 and also supplies speech signals to a loudspeaker 22. This apparatus communicates by radio while utilizing an antenna 27. This circuit is controlled by a microcontroller assembly 25 which, furthermore, processes the data to be written and read from the memory EEPROM 28 which contains crucial data to be protected. The connections between the various elements cited above 25, 15 and 28 are made over a common line BUSI of the I²C type.

Figure 2:
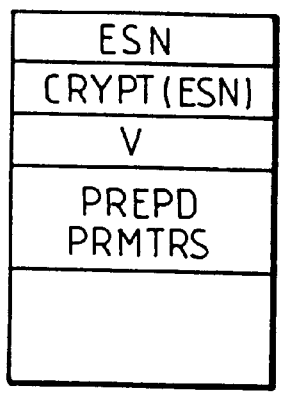
FIG. 2 shows an example of implementation of crucial data in the memory to be protected.

FIG. 2 shows an example of use in the memory EEPROM 28 of important data to be protected. Thus one finds the data ESN which is the serial number of the apparatus, the data CRYPT(ESN) which is the same data but in encrypted form this time, and the data PREPDPRMTRS which are the data defining the prepayment giving, inter alia, the number and the duration of communications which can be made and used.

In accordance with the invention, a generator 50 (represented in FIG. 1 establishes a personality data of the apparatus which is different from the data ESN. This generator 50 generates a value V which is also stored in the memory 28.

The apparatus is used to advantage if all the apparatus can contain a protection device as described by the invention. The value which is locally generated by the generator is compared with the value written in the memory 28. If the two values match, the memory 28 is declared to be authentic and is thus matched well with its apparatus. If not, there is declared that there is a fraud and the operation of the apparatus is blocked. Thus, thanks to the invention, the work of the copier of an EEPROM who would like to insert copied memories into apparatus according to the invention will particularly be made more complicated.

According to a preferred embodiment of the invention, the generator 50 is formed by two resistors R1 and R2 arranged as a potentiometer voltage divider as shown in FIG. 1. These resistors are thus to have different values for each of the apparatus which are manufactured. For this purpose, the tolerance of the resistance values offered on the market may be profited from, for example, 20% on the resistance, or one may take various resistors, mix them before manufacture, so that the resistors mounted during manufacture will have randomly distributed values. The voltage "v" having a random value thus produced is digitized by an analog/digital converter 52. It will be noted that this converter is included in the microprocessor assembly 25. For example, the microcontroller 83C145, manufactured by Philips contains such a converter, so that the implementation of the invention has a strongly reduced cost level. The input voltage comes, for example, from the accumulator 55 of the apparatus preferably followed by a voltage regulator 57.

Figure 3:
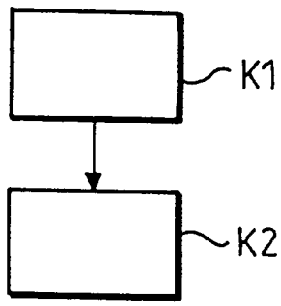
FIG. 3 shows a flow chart explaining the storing of the personality data.

FIG. 3 shows a flow chart explaining the operation of the apparatus when used for the first time. Box K1 explains the measurement of the voltage by the analog/digital converter 52 and box K2 the writing of this digital value in a location of the memory 28.

Figure 4:
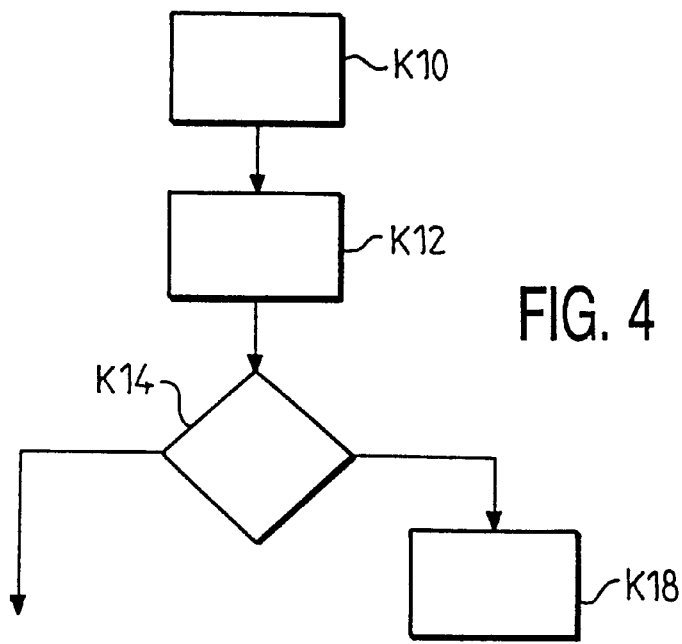
FIG. 4 shows a flow chart explaining the verification of the memory while the apparatus is in normal operation.

FIG. 4 shows the operation on normal switch-on by the user. The first task carried out, indicated by box K10, consists of determining the digital value supplied by the generator 50, after which the value written in the memory 28 (box K12) is taken. These two values are compared with each other, which is indicated in box K14. If the values are different, box K18 is proceeded to which stops the process of switch-on and shows on the display an "error" message. If the values are identical, the user does not notice a thing and his apparatus operates as it should do.

What is claimed is:

1. An electronic apparatus comprising a protection device for data stored in memory, the protection device comprising:
   a generator which produces a signature of the electronic apparatus containing the protection device,
   means for storing said signature in said memory as a personality data of the electronic apparatus when said protection device is switched on for a first time,
   a detecting device which detects said signature when said protection device is switched after said first time, and
   a comparing device for comparing the signature produced by said generator with the personality data stored in said means for storing so as to block the electronic apparatus when said signature diverges from said personality data stored in said means for storing.

2. An electronic apparatus as claimed in claim 1, wherein said generator comprises:
   a voltage divider having an output voltage and being formed by resistors which have tolerance values,
   an analog/digital converter for converting the output voltage of the voltage divider into a digital magnitude,
   first processing means for producting said personality data when the means for storing are switched on for said first time based on said digital magnitude, and
   second processing means for comparing said personality data with said signature produced by said generator, after switch-on for skid first time.

3. A protection method implemented in an electronic apparatus as claimed in claim 1, wherein the protection method comprises:
   forming said personality data of the electronic apparatus, produced by said generator,
   recording in the memory the personality data when the electronic apparatus is used for said first time,
   comparing during operation of the electronic apparatus, the signature produced by the generator and the personality data contained in the memory to be protected, and
   blocking the apparatus if the personality data and the signature are different.

4. An electronic apparatus as claimed in claim 2, wherein said tolerance values are at least 20%.

5. An electronic apparatus as claimed in claim 2, wherein said resistors are chosen at random.

6. A electronic apparatus as claimed in claim 2, wherein said resistors are chosen at random from a group of resistors having different values mixed together.

7. A electronic apparatus as claimed in claim 2, wherein said resistors are chosen from a group of resistors having different values mixed together at random.

8. An electronic apparatus having a protection device, said protection device comprising:
   a generator which produces a signature of said electronic apparatus;
   a memory where said signature is stored as a personality data when said electronic apparatus is switched on for a first time;
   a detector which detects said signature when said electronic apparatus is switched after said first time; and
   a comparator which compares said signature detected by said detector with said personality data stored in said memory to form a comparison result;
   wherein operation of said electronic apparatus is prevented when said comparison result indicates that said signature and said personality data are different.

9. An electronic apparatus as claimed in claim 8, wherein said generator comprises:
   a voltage divider having a voltage output and formed by resistors having predetermined tolerances; and
   a converter which converts said voltage output to a digital value.

10. An electronic apparatus as claimed in claim 9, wherein said predetermined tolerances are at least 20%.

11. An electronic apparatus as claimed in claim 9, wherein said resistors are chosen at random.

12. An electronic apparatus as claimed in claim 9, wherein said resistors are chosen at random from a group of resistors having different values mixed together.

13. An electronic apparatus as claimed in claim 9, wherein said resistors are chosen from a group of resistors having different values mixed together at random.

14. An electric apparatus as claimed in claim 8, wherein said generator comprises a voltage divider having a substantially unique output for forming said signature, said voltage divider having an input connected to a voltage source.

15. A method for protecting an electronic apparatus comprising:
   generating a signature of said electronic apparatus when said electronic apparatus is switched on;
   storing into a memory said signature as a personality data when said electronic apparatus is switched on for a first time;
   comparing said signature with said personality data stored in said memory to form a comparison result when said electronic apparatus is switched on subsequent to said first time; and
   preventing operation of said electronic apparatus when said comparison result indicates that said signature and said personality data are different.

16. The method of claim 15, wherein the generating act includes:
   dividing a voltage by resistors having predetermined tolerances to form a voltage output; and
   converting said voltage output to a digital value.

17. The method of claim 15, wherein said resistors have predetermined tolerances of at least 20%.

18. The method claim 15, wherein said resistors are chosen at random.

19. The method of claim 15, wherein said resistors are chosen at random from a group of resistors having different values mixed together.

20. The method of claim 15, wherein said voltage output is substantially unique to said electronic apparatus and forms said personally data and said signature, said voltage divider having an input connected to a voltage source.

* * * * *